United States Patent [19]
Tosi

[11] 3,869,929
[45] Mar. 11, 1975

[54] KINEMATIC TRANSMISSION DEVICES

[76] Inventor: Arduino Tosi, Route de Mions Toussieu, 69780, St. Pierre de Chandieu, France

[22] Filed: Dec. 10, 1973

[21] Appl. No.: 423,190

[52] U.S. Cl. .................. 74/112, 74/125.5, 74/435
[51] Int. Cl. ........................................... F16h 27/00
[58] Field of Search .......... 74/112, 116, 117, 125.5, 74/435

[56] References Cited
UNITED STATES PATENTS

| | | | |
|---|---|---|---|
| 1,271,207 | 7/1918 | Nickum | 74/116 |
| 2,507,756 | 5/1950 | Boylan | 74/112 |
| 2,566,945 | 9/1951 | Laze | 74/435 |
| 3,415,134 | 12/1968 | Nittka | 74/117 |

FOREIGN PATENTS OR APPLICATIONS

| | | | |
|---|---|---|---|
| 591,331 | 4/1925 | France | 74/117 |
| 529,620 | 6/1954 | Belgium | 74/116 |

*Primary Examiner*—Wesley S. Ratliff, Jr.
*Attorney, Agent, or Firm*—Bacon & Thomas

[57] ABSTRACT

A circular movement transmitting device which comprises a crank provided with a predetermined number of crank-pins angularly distributed in an adjustable manner, and crank-arms articulated by their head on each of the crank-pins of the crank. Levers, are provided one of the ends of which is rotatably connected to the base of the crank-arms. The levers each comprises between their ends a transverse boring which permits to the levers to oscillate around a same axle. Means which are controlled by the levers are adapted to actuate unidirectional driving members wedged on a receiving shaft. Intermediate means amplify the amplitude of the oscillation of the ends of the levers which are opposite the ends articulated to the corresponding crank-arms. Motor means are provided for driving the crank. A gear-train increases the rotary speed of the receiving shaft.

5 Claims, 3 Drawing Figures

KINEMATIC TRANSMISSION DEVICES

The present invention relates to devices for the transmission of a circular movement permitting, in particular, to multiply the torque applied on a primary shaft.

The device, according to the present invention, is characterized by the fact that it comprises a motor crank transmitting its rotary movement to unidirectional driving members wedged on a receiving shaft, the driving members being constituted by free wheels. The crank comprises several crank-pins angularly distributed, in an adjustable manner. Crank-arms are articulated to the crank-pins and levers, comprising cogged portions meshing with the cogs provided on the periphery of the free wheels, are mounted at the free ends of the crank-arms. The levers oscillate around a common axle located near the free wheels.

A further characteristic of the present invention resides in the fact that between the cogged portion of each lever and the corresponding free wheel on the receiving shaft is interposed a further cogged portion oscillating around an intermediate axle. This intermediate cogged portion comprises two opposite cogs of different diameters, one of the cog having a small diameter and being in engagement with the cogged portion of the lever, and the other cog having a greater diameter, and being in engagement with the cog of the free wheel.

The device according to the present invention permits the perfect transmittal of the regular rotary movement of a primary crank to a secondary shaft, while substantially increasing the torque applied to the crank.

The attached drawings, which are given only as way of example, will permit a better understanding of the invention, along with its characteristics and advantages. In the drawings.

Figure 2:
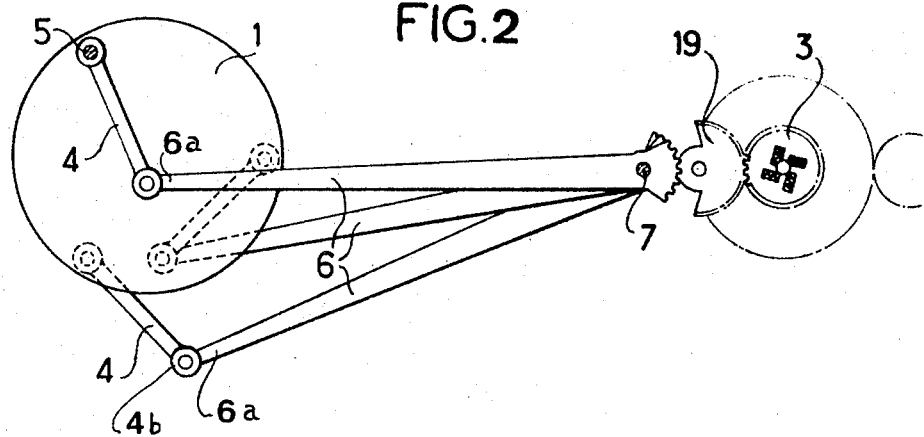
FIG. 2 is a simplified cross-sectional view of a device according to the invention.
Figure 1:
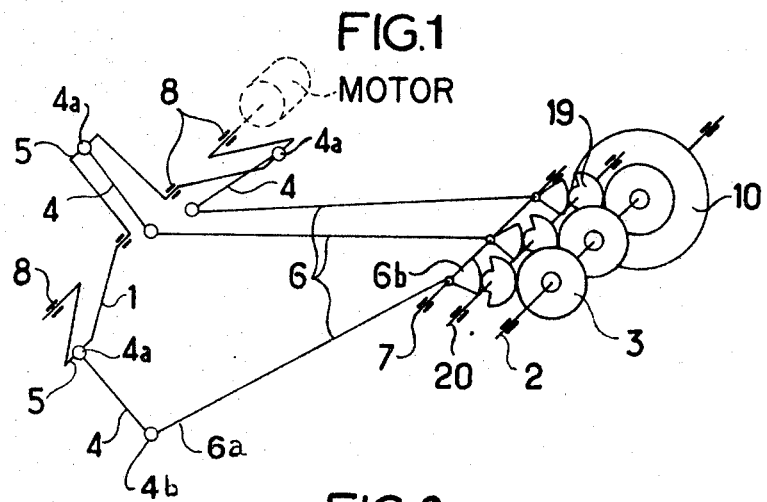
FIG. 1 is a perspective schematic view of a device according to the invention.

Referring now to the drawings, the device represented in FIGS. 1 and 2 essentially comprises a crank 1, a reviving shaft 2 on which are wedged free wheels 3, crank-arms 4 the heads 4a of which are articulated to crank-pins 5 of the crank, and levers 6 oscillating around a fixed axle 7. The crank 1 is rotatably mounted in bearings 8.

It should be understood that crank 1 which is represented having three crank-pins wedged at 120°, may have any other number of crank-pins. Preferably, this number is choosen as high as possible.

Figure 3:
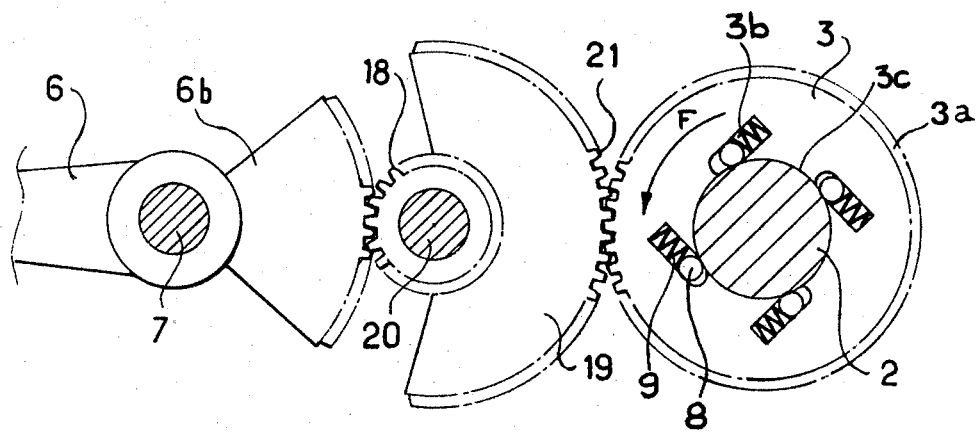
FIG. 3 is a cross-sectional view in a larger scale, showing the details of intermediate driving members on a receiving shaft according to the invention.

The end of lever 6 opposite to the end which is articulated to the base 4b of the crank-arm 4 is arranged in such a way as to present a cogged portion 6b which meshes with a cog 18, of small diameter, of an intermediate portion 19 oscillating around an axle 20, while a cog 21, of greater diameter, opposite the preceding cog, meshes with a cog 3a arranged on the periphery of the free wheels 3 (FIG. 3).

It is easily understood that when crank 1 rotates, levers 6 are animated with an oscillating movement around axle 7, and the cogged portion of levers 6 controls the intermediate cogged portions 19 driving cog 3a in a positive manner. Each free whell 3 comprises, as already known, a certain number of cavities 3b, each of the faces of which located nearest to the center is slightly secant with a boring 3c of the concerned free wheel. In each of the cavities 3b is disposed a roller 8 and a compression spring 9. When cog 3a is driven in the direction of the arrow F, the rollers are pushed by the receiving shaft 2 against the reaction of springs 9 in such a way that the shaft 2 is not driven. On the contrary, when cog 3a rotates in the opposite direction to that indicated by the arrow F, each roller 8 is wedged between the wall of the corresponding cavity 3b and the shaft 2. Shaft 2 being thus rendered solid with the free wheel 3a, it rotates with the free wheel.

It is obvious that the distance separating the primitive diameter of cogged portion 6b from the centre of the axle 7 is very greatly inferior to the distance which separates the centre of the axle 7 from the other end 6a of the concerned lever 6. In this way, the torque applied to crank 1 by a certain means, such as a motor, not shown, is transmitted to shaft 2 multiplied by a coefficient equal to the ratio of the length of the two parts of lever 6. A pinion 11 fast with the shaft, not shown, of the driving mechanism is fixed on shaft 2.

As the distance which separates axle 7 from the periphery of the cogged portions 6b is small, the amplitude of the oscillation of these portions is also small. The intermediate cogged portion 19 is designed to substantially increase the arc of the oscillation angle. In fact, cogged portion 6b drives the small cog 18 of portion 19, whereas the greater cog 21 controls free wheel 3. It is thus seen that despite the same oscillation angle of about 30°, the length of the arc is doubled, i.e., multiplied by a coefficient proportional to the ratio of the diameters of cogs 18 and 21 of the intermediate portion 19.

I claim:

1. A circular movement transmitting device comprising in combination:
    a crank provided with a predetermined number of crank-pins angularly distributed in an adjustable manner,
    a crank-arms articulated by their head on each of the crank-pins of the crank,
    levers, one of the ends of which is rotatably connected to the base of the crank-arms, said levers each comprising between their ends a transverse boring which permits to said levers to oscillate around a same axle,
    means controlled by said levers, said means being adapted to actuate unidirectional driving members wedged on a receiving shaft,
    intermediate means adapted to amplify the amplitude of the oscillation of the ends of the levers which are opposite the ends articulated to the corresponding crank-arms,
    motor means driving the crank,
    a gear-train adapted to increase the rotary speed of the receiving shaft.

2. Device according to claim 1, wherein said unidirectional driving members wedged on the receiving shaft are free wheels of the roller wedged type pushed by springs.

3. Device according to claim 2, wherein said means for actuating the free wheels driving the receiving shaft are constituted of cogged portions adapted to oscillate around a common axle, said cogged portions being themselves driven by further cogged portions arranged at the free end of the levers.

4. Device according to claim 3, wherein the free wheels wedged on the receiving shaft are provided at their periphery with a driving cog.

5. Device according to claim 3, wherein the intermediate cogged portion each comprises two opposite cogs of different diameter, the small cog meshing with the cogged portion of the levers and the greater cog meshing with the free wheels.

* * * * *